(12) United States Patent
Vermillion et al.

(10) Patent No.: US 7,535,553 B2
(45) Date of Patent: May 19, 2009

(54) METHOD, DEVICE, AND COMPUTER PROGRAM FOR DETERMINING RANGE TO A TARGET

(75) Inventors: Jordan Vermillion, Overland Park, KS (US); Bill Cross, Overland Park, KS (US)

(73) Assignee: Bushnell Inc., Overland Park, KS (US)

( * ) Notice: Subject to any disclaimer, the term of this patent is extended or adjusted under 35 U.S.C. 154(b) by 84 days.

(21) Appl. No.: 11/678,417

(22) Filed: Feb. 23, 2007

(65) Prior Publication Data
US 2007/0132982 A1 Jun. 14, 2007

Related U.S. Application Data

(63) Continuation of application No. 10/964,206, filed on Oct. 13, 2004, now Pat. No. 7,239,377.

(51) Int. Cl.
G01C 3/08 (2006.01)
(52) U.S. Cl. .................... 356/4.01; 356/5.01; 356/141.1
(58) Field of Classification Search ................ 356/4.01, 356/5.01, 141.1
See application file for complete search history.

(56) References Cited

U.S. PATENT DOCUMENTS

| 3,464,770 | A | 9/1969 | Schmidt |
| 3,563,151 | A | 2/1971 | Koeber |
| 3,584,559 | A | 6/1971 | Levin |
| 3,639,997 | A | 2/1972 | Koeber |
| 3,644,043 | A | 2/1972 | Jones et al. |
| 3,653,769 | A | 4/1972 | Albright |
| 3,679,307 | A | 7/1972 | Zoot et al. |
| 3,688,408 | A | 9/1972 | Smith et al. |
| 3,690,767 | A | 9/1972 | Missio et al. |
| 3,737,232 | A | 6/1973 | Milburn, Jr. |
| 3,754,828 | A | 8/1973 | Darvasi |
| 3,781,111 | A | 12/1973 | Fletcher et al. |
| 3,797,909 | A | 3/1974 | Hadzimahalis |
| 3,839,725 | A | 10/1974 | Koppensteiner |
| 3,845,276 | A | 10/1974 | Kendy et al. |
| 3,847,474 | A | 11/1974 | Uterhart |
| 3,895,871 | A | 7/1975 | Strasser |
| 3,897,150 | A | 7/1975 | Bridges et al. |
| 3,899,251 | A | 8/1975 | Frenk et al. |
| 3,982,246 | A | 9/1976 | Lubar |

(Continued)

OTHER PUBLICATIONS

Halliday, David Resnick, Robert Walker, Jearl "Fundamentals of Physics" John Wiley and sons 2001 ISBN 0-471-32000-5 pp. 54-58.*

(Continued)

*Primary Examiner*—Timothy A Brainard
(74) *Attorney, Agent, or Firm*—Hovey Williams LLP

(57) ABSTRACT

A method, device, and computer program for determining range to a target is disclosed. Specifically, the invention provides a method, device and computer program for determining a second range to a target based on a first range to the target and an angle to the target such that the parabolic trajectory of a projectile is accounted for in determining the second range. The device generally includes a range sensor for determining a first range to a target, a tilt sensor for determining an angle to the target, and a computing element for determining a second range to the target based on the first range and the determined angle.

33 Claims, 4 Drawing Sheets

U.S. PATENT DOCUMENTS

| | | |
|---|---|---|
| 3,992,615 A | 11/1976 | Bennett et al. |
| 4,025,193 A | 5/1977 | Pond et al. |
| 4,136,394 A | 1/1979 | Jones et al. |
| 4,173,402 A | 11/1979 | Horike et al. |
| 4,195,425 A | 4/1980 | Leitz et al. |
| 4,266,463 A | 5/1981 | Saltin |
| 4,268,167 A | 5/1981 | Alderman |
| 4,305,657 A | 12/1981 | Masunaga et al. |
| 4,321,683 A | 3/1982 | Goring et al. |
| 4,329,033 A | 5/1982 | Masunaga et al. |
| 4,355,904 A | 10/1982 | Balasubramanian |
| 4,457,621 A | 7/1984 | Harris et al. |
| 4,531,052 A | 7/1985 | Moore |
| 4,561,204 A | 12/1985 | Binion |
| 4,593,967 A | 6/1986 | Haugen |
| 4,617,741 A | 10/1986 | Bordeaux et al. |
| 4,665,795 A | 5/1987 | Carbonneau et al. |
| 4,681,433 A | 7/1987 | Aeschlimann |
| 4,760,770 A | 8/1988 | Bagnall-Wild et al. |
| 4,777,352 A | 10/1988 | Moore |
| 4,787,739 A | 11/1988 | Gregory |
| 4,834,531 A | 5/1989 | Ward |
| 4,949,089 A | 8/1990 | Ruszkowski, Jr. |
| 4,965,439 A | 10/1990 | Moore |
| 4,988,189 A | 1/1991 | Kroupa et al. |
| 5,022,751 A | 6/1991 | Howard |
| 5,026,158 A | 6/1991 | Golubic |
| 5,082,362 A | 1/1992 | Schneiter |
| 5,216,815 A | 6/1993 | Bessacini |
| 5,233,357 A | 8/1993 | Ingensand et al. |
| 5,241,360 A | 8/1993 | Key et al. |
| 5,262,838 A | 11/1993 | Tocher |
| 5,280,332 A | 1/1994 | Tocher et al. |
| 5,291,262 A | 3/1994 | Dunne |
| 5,294,110 A | 3/1994 | Jenkins et al. |
| 5,311,271 A | 5/1994 | Hurt et al. |
| 5,313,409 A | 5/1994 | Wiklund et al. |
| 5,359,404 A | 10/1994 | Dunne |
| 5,374,985 A | 12/1994 | Beadles et al. |
| 5,374,986 A | 12/1994 | Solinsky |
| 5,375,072 A | 12/1994 | Cohen |
| 5,479,712 A | 1/1996 | Hargrove et al. |
| 5,483,336 A | 1/1996 | Tocher |
| 5,519,642 A | 5/1996 | Kishimoto |
| 5,539,513 A | 7/1996 | Dunne |
| 5,568,152 A | 10/1996 | Janky et al. |
| 5,586,063 A | 12/1996 | Hardin et al. |
| 5,589,928 A | 12/1996 | Babbitt et al. |
| 5,634,278 A | 6/1997 | London |
| 5,638,163 A | 6/1997 | Nourrcier, Jr. |
| 5,650,949 A | 7/1997 | Kishimoto |
| 5,669,174 A | 9/1997 | Teetzel |
| 5,677,760 A | 10/1997 | Mikami et al. |
| 5,686,690 A | 11/1997 | Lougheed et al. |
| 5,691,808 A | 11/1997 | Nourrcier, Jr. et al. |
| 5,751,406 A | 5/1998 | Nakazawa et al. |
| 5,806,020 A | 9/1998 | Zykan et al. |
| 5,812,893 A | 9/1998 | Hikita et al. |
| 5,824,942 A | 10/1998 | Mladjan et al. |
| 5,914,775 A | 6/1999 | Hargrove et al. |
| 5,933,224 A | 8/1999 | Hines et al. |
| 5,940,171 A | 8/1999 | Tocher |
| 6,023,322 A | 2/2000 | Bamberger |
| 6,034,764 A | 3/2000 | Carter |
| 6,131,294 A | 10/2000 | Jibiki |
| 6,252,706 B1 | 6/2001 | Kaladgew |
| 6,407,817 B1 | 6/2002 | Norita et al. |
| 6,634,112 B2 | 10/2003 | Carr et al. |
| 6,873,406 B1 * | 3/2005 | Hines et al. .............. 356/141.1 |
| 6,886,287 B1 | 5/2005 | Bell et al. |
| 7,118,498 B2 | 10/2006 | Meadows et al. |
| 2002/0107768 A1 | 8/2002 | Davis et al. |
| 2004/0020099 A1 | 2/2004 | Osborn |
| 2005/0021282 A1 | 1/2005 | Sammut |
| 2005/0046706 A1 * | 3/2005 | Sesek et al. .............. 348/231.3 |
| 2005/0198885 A1 | 9/2005 | Staley |
| 2005/0221905 A1 * | 10/2005 | Dunne et al. ................ 473/131 |

OTHER PUBLICATIONS

PTO; Thomas H. Tarcza; Non-Final Office Action; Dec. 7, 2006; U.S. Appl. No. 10/964,206.

PTO; Thomas H. Tarcza; Final Office Action; Jan. 31, 2007; U.S. Appl. No. 10/964,206.

PTO; Thomas H. Tarcza; Non-Final Office Action; Apr. 9, 2007; U.S. Appl. No. 11/610,880.

McNeill, M.D. Williams, L. HuaMeng Chu "Design of a time-of-flight range-finder" Frontiers in Education Conference, 1999. FIE '99. 29th Annual, San Juan, Nov. 10-13, 1999, vol. 3, 13D6/17—13D6/22 vol. 3, ISBN: 0-7803-5643-8, DOI 10.1109/FIE.1999.840476, Nov. 13, 1999.

Pito, R., "Characterization, Calibration, and Use of the Perception Laser Range Finder in a Controlled Environment," (1995). http://scholar.google.com/scholar?num=50&hl=en&lr=&q=3D+laser+rangefinder+-patents&as_ylo=&as_yhi=1997&btnG=Search, 1995.

Leica Geovid 7x42BD Laser Rangefinder Binoculars, eBay item 110227983724, Mar. 5, 2008.

NAIT XLR Range Finder, http://web.archive.org/web//19980119122437/nait.com/xlr.html, Jan. 19, 1998.

"Quantum Range Finding" by Bill Winke, Bowhunting, p. 49-53 & 97, Aug. 1995.

"A look at what's new in laser Rangefinders" by L.D. Standish, Precision Shooting, pp. 44-49, Nov. 1997.

Criterion Series Hand Held Survey Lasers (advertisement), no date.

Hermet, P., "Design of a rangefinder for military purposes," Applied Optics. 11, 273- (1972).

Woodward, J, et al., "Rangefinder, laser AN/GVS-5,", Jun. 1977.

Leica VECTOR Rangefinding Binoculars, http://web.petabox.bibalex.org/web/19970607010412/www.leica.com/optronics/product/vector.htm VX Optronics Corp., Hawk Expeditor & Hawk XTR (2-page-advertisement), no date.

* cited by examiner

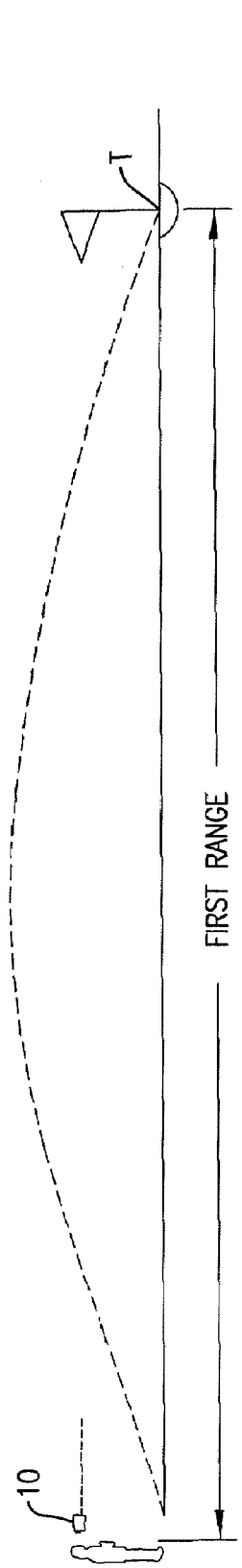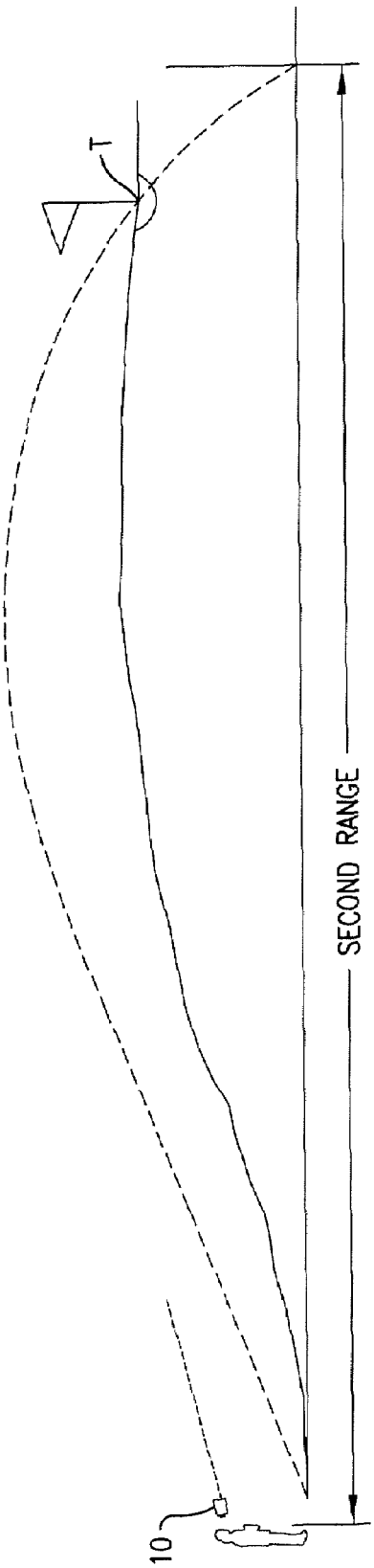

| Angle θ | Multiplier |
|---|---|
| 1 | 0.0175 |
| 2 | 0.035 |
| 3 | 0.0525 |
| 4 | 0.07 |
| 5 | 0.0875 |
| 6 | 0.105 |
| 7 | 0.1225 |
| 8 | 0.14 |
| 9 | 0.1575 |
| 10 | 0.175 |
| 11 | 0.1925 |
| 12 | 0.21 |
| 13 | 0.2275 |
| 14 | 0.25 |
| 15 | 0.27 |
| 16 | 0.29 |
| 17 | 0.305 |
| 18 | 0.325 |
| 19 | 0.345 |
| 20 | 0.3625 |

Fig. 6.

| First Range | Angle | Multiplier | Factor | Second Range |
|---|---|---|---|---|
| 100 | 3 | 0.0525 | 0.0394 | 104 |
| 150 | 5 | 0.0875 | 0.0875 | 163 |
| 200 | 7 | 0.1225 | 0.1225 | 225 |
| 124 | 7 | 0.1225 | 0.092 | 135 |
| 218 | 4 | 0.07 | 0.07 | 233 |
| 241 | 6 | 0.105 | 0.105 | 266 |
| 104 | -2 | -0.035 | -0.263 | 101 |
| 148 | -6 | -0.105 | -0.105 | 132 |

Fig. 7.

METHOD, DEVICE, AND COMPUTER PROGRAM FOR DETERMINING RANGE TO A TARGET

RELATED APPLICATION

The present application is a continuation patent application and claims priority benefit, with regard to all common subject matter, of earlier-filed U.S. patent application titled "METHOD, DEVICE, AND COMPUTER PROGRAM FOR DETERMINING A RANGE TO A TARGET", Ser. No. 10/964,206, filed Oct. 13, 2004. The identified earlier-filed application is hereby incorporated by reference into the present application.

BACKGROUND OF THE INVENTION

1. Field of the Invention

The present invention relates to a method, device, and computer program for determining a range to a target. More particularly, the invention relates to a method, device, and computer program for determining a second range to a target based on a first range and an angle to the target such that the parabolic trajectory of a projectile is accounted for in determining the second range.

2. Description of the Related Art

It is often desirable to determine accurate ranges to targets in various situations. For example, golfers utilize a range to a target, such as a range to a green or a pin positioned on the green, in determining club selection. Conventional devices have been developed to determine ranges to targets. However, these conventional devices determine ranges which only represent a straight-line distance to a target and which fail to account for the parabolic trajectory of projectiles, such as a golf ball, intended for the target. As a result, these conventional devices generate inaccurate results if a target is positioned above or below the device. For instance, if a target is positioned above a device, a projectile originating at the device, such as a struck golf ball, must be struck to travel a greater distance to reach the target than if the target was not positioned above the device due to the parabolic trajectory of the golf ball. Similarly, if a target is positioned below a device, a projectile originating at the device must be struck to travel a lesser distance to intersect the target than if the target was not positioned below the device. Conventional devices are unable to account for this increase or decrease in distance to a target caused by the trajectory of the projectile and the angle to the target.

As individuals often determine ranges to targets while outdoors on terrains of varying slopes, such as a golfer on a golf course, the inaccurate results generated by conventional range determining devices substantially inhibit the use of the devices and negate many beneficial aspects of the devices. For instance, a golfer is unlikely to utilize a range finding device which provides inaccurate yardage measurements over sloping terrain and thus is forced to use multiple devices to determine a single accurate range or manually estimate or guess at the correct yardage based on the determined range. Such use of estimations and multiple devices results in undesirable inconvenience and inaccuracy.

SUMMARY OF THE INVENTION

The present invention solves the above-described problems and provides a distinct advance in the art of determining ranges to targets or other objects. More particularly, the invention provides a method, device, and computer program for determining a second range to a target based on a first range and an angle to the target such that the parabolic trajectory of a projectile is accounted for in determining the second range.

In one embodiment, the present invention concerns a device for determining a range to a target. The device includes a range sensor for determining a first range to the target, a tilt sensor for determining an angle to the target, and a computing element for determining a second range to the target based on the first range and the determined angle.

In another embodiment, the device includes a laser range sensor for determining a first range to the target, a tilt sensor for determining an angle to the target relative to the device based on the orientation of the device, a computing element for determining a second range to the target by adjusting the first range by a factor corresponding to the determined angle, and a display for indicating relevant information including the first range and/or the second range.

In a further embodiment, the present invention concerns a computer program comprising a combination of code segments stored in a computer-readable memory and executable by a computing element. The computer program includes a code segment operable to determine a first range to a target based on a first input, a code segment operable to determine an angle to the target relative to the device based on a second input, and a code segment operable to determine a second range to the target by adjusting the first range by a factor corresponding to the determined angle.

In a still further embodiment, the present invention concerns a method for utilizing a portable electronic device to determine a range to a target. The method includes determining a first range from the device to the target with a laser range sensor, determining an angle to the target relative to the device with a tilt sensor, determining a second range to the target by adjusting the first range by a factor corresponding to the determined angle, and indicating the first range, the angle, and/or the second range.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 4 is a diagram illustrating a first range to a target and a trajectory to the first target;

FIG. 4a is a diagram illustrating a second range and trajectory to the target of FIG. 4 when the target is elevated;

FIG. 6 is a table presenting examples of the multipliers utilized by the present invention to calculate factors;

FIG. 7 is a table presenting examples of the second ranges determined by utilizing some of the factors calculated with the multipliers presented in FIG. 6.

Figure 1:
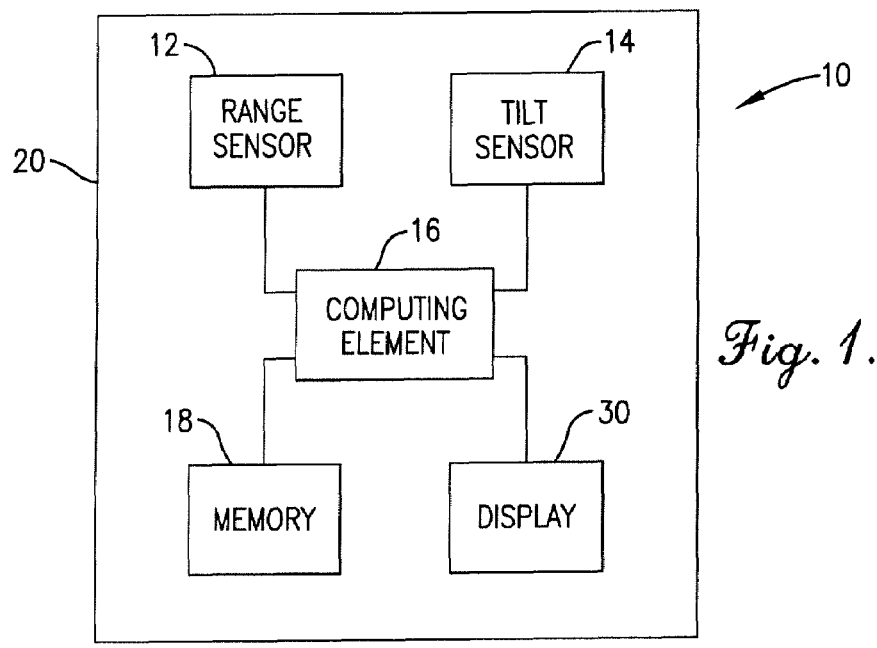
FIG. 1 is a block diagram showing various components of a device constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
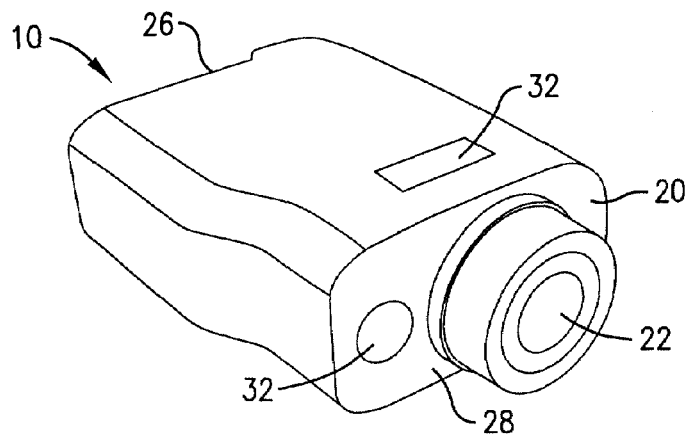
FIG. 2 is a rear isometric view of the device of FIG. 1.
Figure 3:
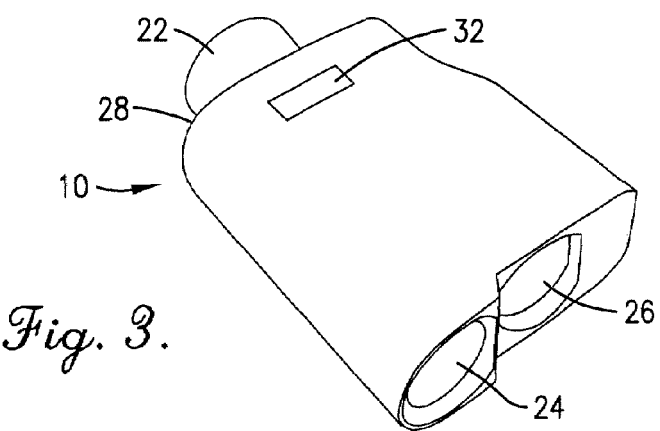
FIG. 3 is a front isometric view of the device of FIGS. 1 and 2.

Turning now to the drawing figures, and particularly FIGS. 1-3, a device 10 is shown constructed in accordance with a preferred embodiment of the present invention. The device 10 broadly includes: a range sensor 12 for determining a first range to a target T; a tilt sensor 14 for determining an angle θ to the target T; a computing element 16 coupled with the range sensor 12 and tilt sensor 14 for determining a second range to the target T based on the first range and the determined angle θ; a memory 18 for storing data such as a computer program to control the functionality of the device 10; and a portable handheld housing 20 for housing the range sensor 12, the tilt sensor 14, the computing element 16, the memory 18, and other components described below.

The computer program controls input and operation of the device 10. The computer program includes at least one code segment stored in or on a computer-readable medium residing on or accessible by the device 10 for instructing the range sensor 12, tilt sensor 14, computing element 16, and any other related components to operate in the manner described herein. The computer program is preferably stored within the memory 18 and comprises an ordered listing of executable instructions for implementing logical functions in the device 10. However, the computer program may comprise programs and methods for implementing functions in the device 10 which are not an ordered listing, such as hard-wired electronic components, programmable logic such as filed-programmable gate arrays (FPGAs), application specific integrated circuits, or other similar or conventional methods for controlling the operation of electrical or other computing devices.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer-readable medium may even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The device 10 and computer program illustrated and described herein are merely examples of a device and a program that may be used to implement the present invention and may be replaced with other devices and programs without departing from the scope of the present invention.

Figure 5:
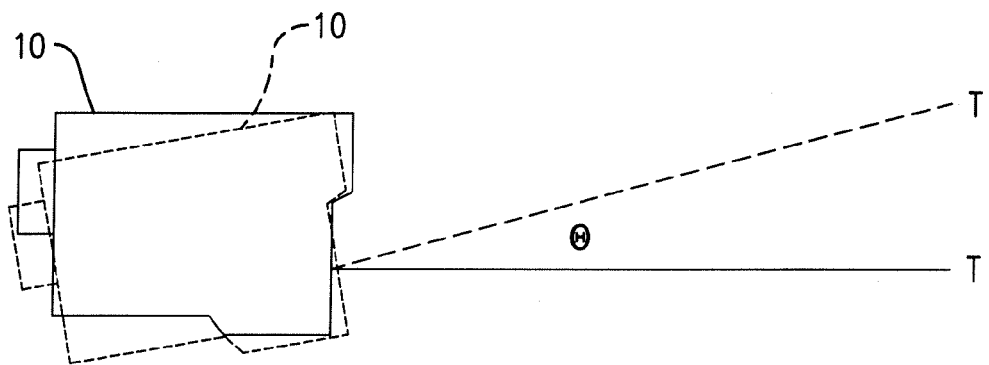
FIG. 5 is a diagram illustrating an angle to an elevated target relative to the device.

Referring to FIGS. 1-5, the range sensor 14 is operable to determine the first range to the target T from the device 10. The range sensor 14 may be any conventional sensor or device for determining range. The first range preferably represents a length of an imaginary line drawn between the device 20 and the target T, as shown in FIGS. 4 and 5, such as the number of feet, meters, yards, miles, etc, directly between the device 10 and the target T. The first range may also represent other units of measurements, such as an estimated golf club length required to reach the target T.

Preferably, the range sensor 14 is a laser range sensor which determines the first range to the target by directing a laser beam at the target T, detecting a reflection of the laser beam, measuring the time required for the laser beam to reach the target and return to the range sensor 14, and calculating the first range of the target T from the range sensor 14 based on the measured time. Thus, the range sensor 14 may include an emitter and a detector to emit the laser beam and then detect the reflection of the laser beam in a generally conventional manner.

The range sensor 14 is operable to determine a range to a target even when objects, such as trees, people, vehicles, foliage, etc, are positioned between the device and the target. As a result, the range sensor 14 may determine the first range to the target T in a variety of situations, including on golf courses and other outdoor situations where various trees and/or other foliage may obstruct a direct view of the target T.

The range sensor 14 may also include memory and processing capabilities separate from the computing element 16 and memory 18, such that the range sensor is operable to determine the range to the target T without the assistance of additional components. However, the range sensor 14 may rely upon the capabilities provided by the computing element 16 and memory 18 to specifically calculate and determine the first range. The range sensor 14 may alternatively or additionally include other range sensing components, such as conventional optical, radio, sonar, or visual range sensing devices to determine the first range in a substantially conventional manner.

The range sensor 14 may be specifically configured for use with a specific type of target. For instance, the target T may be a portion of a golf course, such as a green or a pin positioned on the green, as described below in detail, and the range sensor 14 may be specifically configured to more accurately determine the first range based on the characteristics of the desired and known target. For example, the range sensor 14 may emit a laser beam having a specific wavelength or intensity to reflect off the target T in an anticipated and desired manner due to the characteristics of the desired target, such as a colored pin or a reflective flag positioned on the pin. Thus, the accuracy of the determined first range may be increased by specifically configuring the range sensor 14 utilizing the anticipated and desired reflection characteristics of the known target T.

Referring to FIGS. 4, 4a, and 5, the tilt sensor is operable to determine the angle θ to the target T from the device 10 relative to the horizontal. Thus, if the device 10 and the target T are both positioned on a flat surface having no slope, the angle θ would be zero. If the device 10 is positioned below the target T as shown in FIG. 4a, the slope between the device 10 and the target T is positive, the angle θ would be positive. Conversely, if the device 10 is positioned above the target T, such that the slope between the device 10 and the target T is negative, the angle θ would be negative. It will be appreciated that the angle θ is not dependent upon the specific contours of the ground or surface or surfaces between the device 10 and the target T, but rather the angle θ is preferably determined based on the orientation of the device 10, as described below.

The tilt sensor 14 preferably determines the angle θ by sensing the orientation of the device 10 relative to the target T and the horizontal. The orientation of the device 10 changes based on the relative position of the target T to the device 10, as a user of the device 10 aligns the device 10 with the target T and views the target T through an eyepiece 22 and an opposed lens 24, as described in more detail below. Thus, the orientation of a device, specifically the tilt of the device 10 along its longitudinal axis relative to the horizontal, indicates if the target T is above or below the device 10. For example, if the target T is above the device 10, the user of the device 10 would tilt the device 10 such that a distal end 26 of the device 10 would be raised relative to a proximate end 28 of the device 10 and the horizontal. Similarly, if the target T is below the device 10, the user of the device 10 would tilt the device 10 such that the distal end 26 of the device 10 would be lowered relative to the proximate end 28 of the device and the horizontal. The tilt sensor 14 preferably determines the angle θ of the target to the device 10 based on the amount of tilt, that is the amount the proximate end 28 is raised or lowered relative to the distal end 26, as described below.

The tilt sensor 14 may determine the tilt of the device, and thus the angle θ, through various orientation determining means. For instance, the tilt sensor 14 may utilize one or more single-axis or multiple-axis magnetic tilt sensors to detect the strength of a magnetic field around the device 10 or tilt sensor 14 and then determine the tilt of the device 10 and the angle θ accordingly. The tilt sensor 14 may determine the tilt of the device using other or additional conventional orientation determine means, including mechanical means, chemical means, gyroscopic means, and/or electronic means, such as a resistive potentiometer. Preferably, the tilt sensor 14 is an electronic inclinometer, such as a clinometer, operable to determine both the incline and decline of the device 10 such that the angle θ may be determined based on the amount of incline or decline. Thus, as the device 10 is aligned with the target T by the user, the device 10 may be tilted such that its proximate end 28 is higher or lower than the distal end 26, and the tilt sensor 16 will detect the amount of tilt which is indicative of the angle θ.

The computing element 16 may be a conventional microprocessor, microcontroller, or other electrical element or combination of elements, such as a single integrated circuit housed in a single package, multiple integrated circuits housed in single or multiple packages, or any other combination. Similarly, the computing element 16 may be any element which is operable to determine the second range from the first range and angle θ as described below. Thus, the computing element 16 is not limited to conventional microprocessor or microcontroller elements and may include any element which is operable to perform the functions described below.

The computing element 16 is coupled with the range sensor 14 and the tilt sensor 16 to determine the second range to the target T based on the first range and the determined angle θ. The second range may be determined statically such that the second range is determined only at desired intervals or upon input by the user. Conversely, the second range may be dynamically determined such that the second range may be continuously updated as new first ranges or angles or provided. Thus, the second range may be accurately determined for moving targets, such as a hunted animal, as the change in the targets position is accounted for by the dynamic calculations.

The computing element 16 determines the second range to the target T by adjusting the first range by a factor corresponding to the angle θ. The factor adjusts the first range to account for an estimated trajectory of a projectile. Thus, the second range preferably represents a distance the projectile must travel such that the estimated trajectory of the projectile generally intersects with the target T. In contrast, the first range represents the length of an imaginary line between the device 10 and the target T, which is a substantially straight line, as described above. As is known in the art, projectiles which are not self-propelled, such as bullets, golf balls, footballs, arrows, etc, move through air according to a generally parabolic (ballistic) curve due primarily to the effects of gravity and air drag. In situations where the angle θ is zero, the parabolic movement of the projectile does not substantially affect the range calculation.

As shown in FIG. 5, in situations where the angle θ is non-zero, such as when the target T is positioned above or below the device 10, the parabolic movement of the projectile affects the range calculation, such that the projectile may have to travel a longer or shorter distance to reach the target T. The factor adjusts the first range to account for the longer or shorter distance the projectile must travel to reach the target T due to the angle θ such that the second range is an accurate representation to the user of the flat-ground distance the projectile must travel to intersect the target T.

For example, a first range may be 100 yards which represents a straight line distance to a target, but with an angle of three degrees, a second range will be 104 yards, as determined by a calculation described below in detail. The second range of 104 yards represents the flat-ground range the projectile must travel such that its trajectory intersects the target at a position, as shown in FIG. 4a. Thus, the second range does not represent the actual straight-line distance to the target as it includes the larger or smaller distance the projectile must travel to intersect with target. For instance, if a user is 100 yards away from a target and desires to hit a golf ball at the target, the user would attempt to strike the golf ball 100 yards. On flat ground, no additional computation is needed and a golf ball struck to travel 100 yards will reach the target. However, on non-flat ground, such as when the angle θ is three degrees for example, if the user strikes the golf ball to travel 100 yards as if on flat ground, the golf ball will fall short of the target due to the parabolic trajectory of the golf ball. In contrast, if the user strikes the golf ball to reach the second range, 104 yards as if on flat ground for example, the golf ball will not fall short of the target as the trajectory of the golf ball will intersect with the target due to the increased distance accounted for by the second range.

Referring to FIG. 6, The factor may be determined utilizing conventional and well known algorithms or tables which account for the generally parabolic movement of a projectile through air based on a source angle of the projectile. Preferably, the factor is determined based on the angle θ and a multiplier corresponding to the tangent of the angle θ. The factors, and associated information, as described below, may be stored in the memory 18 to facilitate and expedite calculations by the computing element 16.

As shown in FIGS. 6 and 7, the memory 18 may include a list of angles, corresponding multipliers, and factors which are determined by scaling the multipliers based on the first range. For each angle, the corresponding multiplier is equal to the tangent of the angle and is also scaled based on the first range to determine the factor. The multiplier is scaled such that if the first range is less than or equal to 100 yards, the multiplier is reduced to one-half such that the factor equals one-half the multiplier. If the first range is between 100 yards and 140 yards, the factor will equal three-fourths of the multiplier. If the range is greater than 140 yards, the multiplier is not scaled such that the factor equals the multiplier. For negative angles, the multiplier is equal to the negative of the multiplier for the corresponding positive angle. Additionally, other scaling methods may be employed which adjust the multipliers or factors to account for the change in tangential value that occurs as a target approaches a reference point, such as when the target T is relatively near the device 10.

FIG. 7 presents an example table of first ranges and corresponding multipliers, factors, and second ranges. The second ranges may be determined from the factors utilizing any formula or calculation which accounts for the trajectory of a projectile. Preferably, the second ranges are determined from the first ranges and factors using the formula:

SecondRange=FirstRange+(Factor*FirstRange)

Although the factors of FIGS. 6 and 7 are presented and described as scaled or unscaled multipliers which are multiplied by the first range and then added to the first range to determine the second range, the factors may be of any form or type which enables the trajectory of the projectile to be accounted for by the second range. For instance, various mathematical equivalents may be determined which are generally similar to the multipliers, factors, and formulas described above and which perform generally the same operation. Additionally, the factors may be any equation, algorithm, or estimation which are performed to adjust the first range for the trajectory of the projectile.

Additionally, the computing element 16 may determine the second range without utilizing factors, such as by utilizing the first range to estimate a full trajectory for the projectile and then modifying the estimated full trajectory based on the angle. However, it will be appreciated that utilizing factors expedites the determination of the second range as there is a generally finite number of useful angles and corresponding factors which may be calculated in advance and stored in the memory 18 such that the computing element 16 is not required to perform extensive or resource-consuming calculations to determine each second range.

The factor may also be specifically determined for a desired projectile as projectiles having different shapes have different trajectories due to drag. For instance, the generally parabolic trajectory for a golf ball stuck with a golf club is substantially different than the ballistic trajectory for a bullet fired from a firearm. Thus, it is desirable to select a factor which corresponds to the utilized projectile due to the varying shapes of various projectiles. For example, a golfer would utilize a factor which corresponds to a golf ball such that the trajectory of the golf ball is accurately accounted for to maximize the accuracy of the second range calculation. The device 10 may enable the user to select a desired projectile or desired projectile characteristic.

The factor and factors may be calculated by the computing element 16 upon request by the computer program, such as at any time when the second range needs to be calculated. Additionally or alternatively, the factors may be pre-stored in the memory 16 such that the factors do not need to be specifically calculated by the computing element 16 and instead may be determined by looking up the angle θ, corresponding factor, and first range in the memory 16, such as within a look-up table. Upon looking up the factor, the computing element 16 may multiply the factor with the first range, as described above, to determine the second range. A comprehensive list of pre-stored angles, factors, first ranges, and second ranges may also be included in the memory 18 such that the computing element is not required to perform a multiplication operation for the second range calculation and instead the computing element 16 may simply lookup the second range based on the stored angle and first range utilizing one or more look-up tables or other storage methods.

The computing element 16 may additionally determine a desired change in golf club selection. As described above, a user may attempt to strike a golf ball shorter or longer based on the second range which includes the affects of the angle θ and the parabolic trajectory of the golf ball. Users often control how far a golf ball will travel based on a club selection. For instance, a ball struck with a wedge may travel 100 yards, while a ball struck with a 9-iron may travel 115 yards. The user may provide specific club data and corresponding distance data and store such club data in the memory 18 to allow the computing element 16 to access the stored club data and determine a desired change in golf club selection based on the second range or the difference between the first range and the second range.

However, the computing element 16 may determine a desired change in golf club selection without requiring the user to input club data. For example, if the second range exceeds the first range by ten yards, the computing element 16 may determine that an extra club length is needed (e.g. an 7 iron versus a 8 iron), or if the second range exceeds the first range by thirty yards, the computing element 16 may determine that two extra club lengths are needed (e.g. a 6 iron versus a 8 iron). Similarly, the computing element 16 may compare the determined second range to the club data stored in the memory 16 and determine a desired change in club selection accordingly.

The memory 18 is coupled with the computing element 16 and is operable to store the computer program and data such as the factors described above. The memory 18 may be, for example, an electronic, magnetic, optical, electromagnetic, infrared, or semi-conductor system, apparatus, device, or propagation medium. More specific, although not inclusive, examples of the memory 18 include the following: an electrical connection having one or more wires, a portable computer diskette, a random access memory (RAM), a read-only memory (ROM), an erasable, programmable, read-only memory (EPROM or Flash memory), an optical fiber, a portable compact disc (CD), or a digital video disc (DVD). However, the memory 18 may be of any form operable to store the necessary computer program and data.

The memory 18 may be integral with the computing element 16, such that the memory 18 and the computing element 16 are stored within or on the same wafer, die, or package, or the memory 16 may be discrete with the computing element 16 such that the memory 18 and the computing element 16 are stored on different wafers, dies, or packages. Additionally, the memory 18 may be coupled with other components, such as the range sensor 12 and tilt sensor 14, to enable the other components to utilize the functionality provided by the memory 18. The memory 18 may also be accessible by other external devices, such as conventional computing devices, to enable data stored within the memory, such as the factors or the computer program, to be easily accessed or modified by the conventional computing device.

Figure 8:
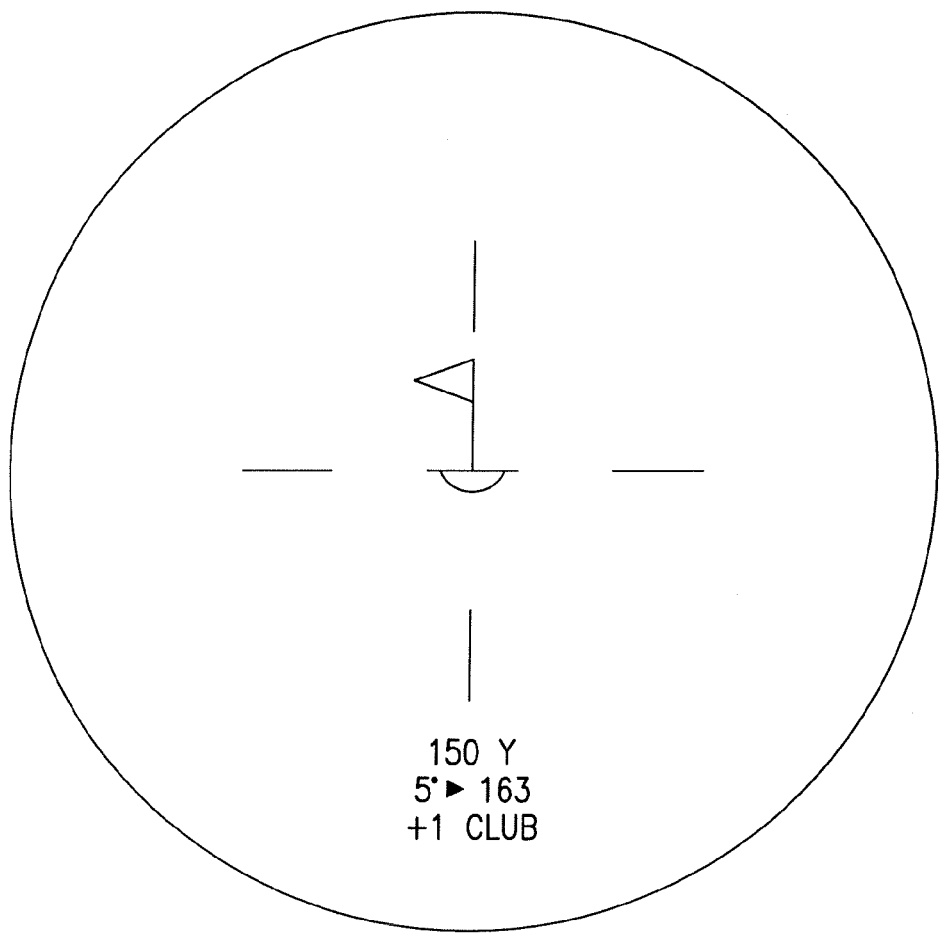
FIG. 8 is a schematic view of a target observed while looking through the device which indicates the first range, the determined angle, the second range, and a recommended change in club length.

The device 10 also preferably includes a display 30 to indicate relevant information such as the first range, the angle θ, the second range, the selected club, a reticle or other alignment element, the recommended club, and/or the recommended club change. The display 30 may be a conventional electronic display, such as a LED or LCD display. Preferably, the display 30 is viewed by looking through the eyepiece 22 such that a user may align the target T and simultaneously view relevant information, as shown in FIG. 8. For instance, the user may look through the eyepiece 22, align the target T, view the target T, and generally simultaneously view the display 30 to determine the first range, the angle θ, the second range, and/or other relevant information. The generally simultaneous viewing of the target T and the relevant information enables the user to quickly and easily determine a plurality of ranges to various targets by moving the device 10 in an appropriate direction and dynamically viewing the change in the relevant information on the display 30.

The portable housing 20 houses the range sensor 12, tilt sensor 14, computing element 16, and/or other desired elements such as the display 30, one or more inputs 32, eyepiece 22, lens 24, laser emitter, laser detector, etc. The portable housing 20 enables the device 10 be easily and safely transported and maneuvered for convenient use in a variety of locations. For example, the portable handheld housing 20 may be easily transported in a golf bag for use on a golf course. Additionally, the location of the components on or within the housing 20, such as the position of the eyepiece 22 on the proximate end 28 of the device 10, the position of the lens 24 on the distal end 26 of the device, and the location of the inputs 32, enables the device 10 to be easily and quickly operated by a user with one hand without a great expenditure of time or effort.

In operation, a user selects a desired target, such as the target T. The target T may be any physical target of which the range sensor 14 is operable to determine the first range. For example, the target T may be a pin positioned on a golf green. The user may desire to know an accurate range to the pin, or other such target, and thus which club to use. To determine the first range, angle, and the second range, the user aligns the device 10 with the target by looking through the eyepiece 22 and directing the lens 24 towards the target T. By looking through the eyepiece 22, the user may view surrounding terrain in a substantially conventional manner utilizing conventional telescope or binocular capabilities. A reticle or other aiming device may be provided by the eyepiece 22, lens 24, and/or display 30 to assist the user in aligning the device, as is shown in FIG. 8.

The user may function the inputs 32 to control the operation of the device 10. For example, the user may activate the device 10, program its functionality, store data, such as the club data described above, in the memory 18, and/or determine the first range, second range, and angle by functioning one or more of the inputs 32. For example, the user may align the target T by centering the reticle over the target T function at least one of the inputs 32 to cause the range sensor 12 to determine the first range. Alternatively, the range sensor 12 may dynamically determine the first range for all aligned objects such that the user is not required to function the inputs 32 to determine the first range. Similarly, the tilt sensor 14 may dynamically determine the angle θ for all aligned objects or the tilt sensor may determine the angle θ when the user functions at least one of the inputs 32.

The computing element 16 may continuously determine the second range based upon the dynamic first range and angle θ, or the computing element 16 may determine the second range when the user functions at least one of the inputs 32. Similarly, the computing element 16 may continuously determine the desired change in club length based upon the determined first range and second range, or the difference thereof, or the computing element 16 may determine the desired change in club length when the user functions at least one of the inputs 32.

The user preferably views the target T and relevant information, such as the first range, the angle θ, the second range, the difference between the first range and the second range, the desired change in club length, or any combination thereof, by looking through the eyepiece 22. As shown in FIG. 8, the user may view displayed information generally simultaneously with the target T as the information is displayed in proximity to the reticle and target T. As discussed above, the relevant information may be dynamically displayed on the display 30 to enable the user to simultaneously view the target T and the dynamic information.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and described to be protected by Letters Patent includes the following:

1. A device for determining a range to a target, the device comprising:
    a range sensor for determining a first range to the target;
    a tilt sensor for determining an angle to the target relative to the device; and
    a computing element, coupled with the range sensor and the tilt sensor, for determining a second range based on the first range, a precalculated factor based on the determined angle and golf ball flight characteristics in air, and scaled based on the first range where:
        when the first range is less or equal to a first threshold value, the factor is scaled by a first value;
        when the first range is between the first threshold value and a second threshold value, the factor is scaled by a second value; and
        when the first range is greater than or equal to the second threshold value, the multiplier is a third value,
    the second range being a representation of a flat-ground distance the projectile must travel such that the projectile's trajectory intersects the target.

2. The device as set forth in claim 1, wherein the computing element additionally determines a desired change of a golf club length which corresponds to the difference between the second range and the first range.

3. The device as set forth in claim 1, wherein the range sensor is a laser range sensor.

4. The device as set forth in claim 1, wherein the tilt sensor is an inclinometer.

5. The device as set forth in claim 1, wherein the tilt sensor determines the angle based on an orientation of the device.

6. The device as set forth in claim 1, further including a display, coupled with the computing element, for indicating the first range, the second range, and the determined angle.

7. The device as set forth in claim 1, further including a portable handheld housing for housing the range sensor, the tilt sensor, and the computing element.

8. The device as set forth in claim 1, wherein the target is at least a portion of a golf course.

9. An electronic device for determining a range to a target, the device comprising:
    a laser range sensor for determining a first range to the target;
    a tilt sensor for determining an angle to the target relative to the device based on the orientation of the device;
    a computing element, coupled with the distance sensor and the tilt sensor, for determining a second range by adjusting the first range by a precalculated factor based on the determined angle and golf ball flight characteristics in air, and scaled based on the first range where:
        when the first range is less or equal to a first threshold value, the factor is scaled by a first value;
        when the first range is between the first threshold value and a second threshold value, the factor is scaled by a second value; and
        when the first range is greater than or equal to the second threshold value, the multiplier is a third value,
    the second range being a representation of a flat-ground distance the projectile must travel such that the projectile's trajectory intersects the target; and a display, coupled with the computing element, for indicating the first range and the second range.

10. The device as set forth in claim 9, wherein the display additionally indicates the determined angle.

11. The device as set forth in claim 9, wherein the computing element additionally determines a desired change of a golf club length which corresponds to the difference between the second range and the first range.

12. The device as set forth in claim 9, wherein the display additionally indicates the change of the golf club length.

13. The device as set forth in claim 9, wherein the target is at least a portion of a golf course.

14. The device as set forth in claim 13, wherein the target is at least a portion of a golf green.

15. The device as set forth in claim 14, wherein the target is at least a portion of a pin positioned on the golf green.

16. The device as set forth in claim 9, further including a portable handheld housing for housing the laser range sensor, the tilt sensor, the computing element, and the display.

17. The device as set forth in claim 9, wherein the tilt sensor is an inclinometer.

18. The device as set forth in claim 9, further including a memory for storing a look-up table having a plurality of angles and corresponding factors.

19. The device as set forth in claim 18, wherein the factor is determined by looking up the determined angle in the look-up table.

20. The device as set forth in claim 9, wherein the computing element determines the second range by multiplying the first range by the factor.

21. A device for determining a range to a target on a golf course, the device comprising:

a range sensor for determining a first range to the target;

a tilt sensor for determining an angle to the target relative to the device;

a computing element, coupled with the range sensor and the tilt sensor, for determining a second range based on the first range, the determined angle, and a precalculated factor based on the determined angle and golf ball flight characteristics in air and scaled based on the first range where:

when the first range is less than or equal to a first threshold value, the factor is scaled by a first value:

when the first range is between the first threshold value and a second threshold value, the factor is scaled by a second value; and when the first range is greater than or equal to the second threshold value, the multiplier is a third value; and a display for indicating the first range and data or a representation related to the second range.

22. The device as set forth in claim 21, wherein the second range is representative of a flat-ground distance the golf ball must travel such that the golf ball's trajectory intersects the target.

23. The device as set forth in claim 21, wherein the computing element retrieves the factor from memory to determine the second range.

24. The device as set forth in claim 21, wherein the computing element calculates the factor with an algorithm to determine the second range.

25. The device as set forth in claim 21, wherein the computing element determines the second range by multiplying the first range by the factor.

26. The device as set forth in claim 21, wherein the computing element determines the second range by selecting it from a look-up table based on the determined angle and the first range.

27. The device as set forth in claim 21, wherein the computing element further compares the first range to the second range to determine a desired change of a golf club length.

28. The device as set forth in claim 21, wherein the range sensor is a laser range sensor.

29. The device as set forth in claim 21, wherein the tilt sensor is an inclinometer that determines the angle based on an orientation of the device.

30. The device as set forth in claim 21, further including a display, coupled with the computing element, for indicating the first range, the second range, and the determined angle.

31. The device as set forth in claim 21, further including a portable handheld housing for housing the range sensor, the tilt sensor and the computing element.

32. The device as set forth in claim 21, wherein the data or the representation related to the second range is a numerical indication of the second range or a graphical representation of the second range.

33. A device for determining a range to a target, the device comprising:

a range sensor for determining a first range to the target;

a tilt sensor for determining an angle to the target relative to the device; and a computing element, coupled with the range sensor and the tilt sensor, for determining a second range based on the first range, a precalculated factor based on the determined angle and golf ball flight characteristics in air, and scaled based on the first range where:

when the first range is less or equal to a first threshold value, the factor is scaled by a first value;

when the first range is greater than the first threshold value, the factor is scaled by a second value;

the second range being a representation of a flat-ground distance the projectile must travel such that the projectile's trajectory intersects the target.

* * * * *